V. R. COLLARD.
RESILIENT SUSPENSION DEVICE FOR THE BODIES OF MOTOR CARS AND SIMILAR ROAD VEHICLES.
APPLICATION FILED OCT. 14, 1913.
1,131,118.  Patented Mar. 9, 1915.
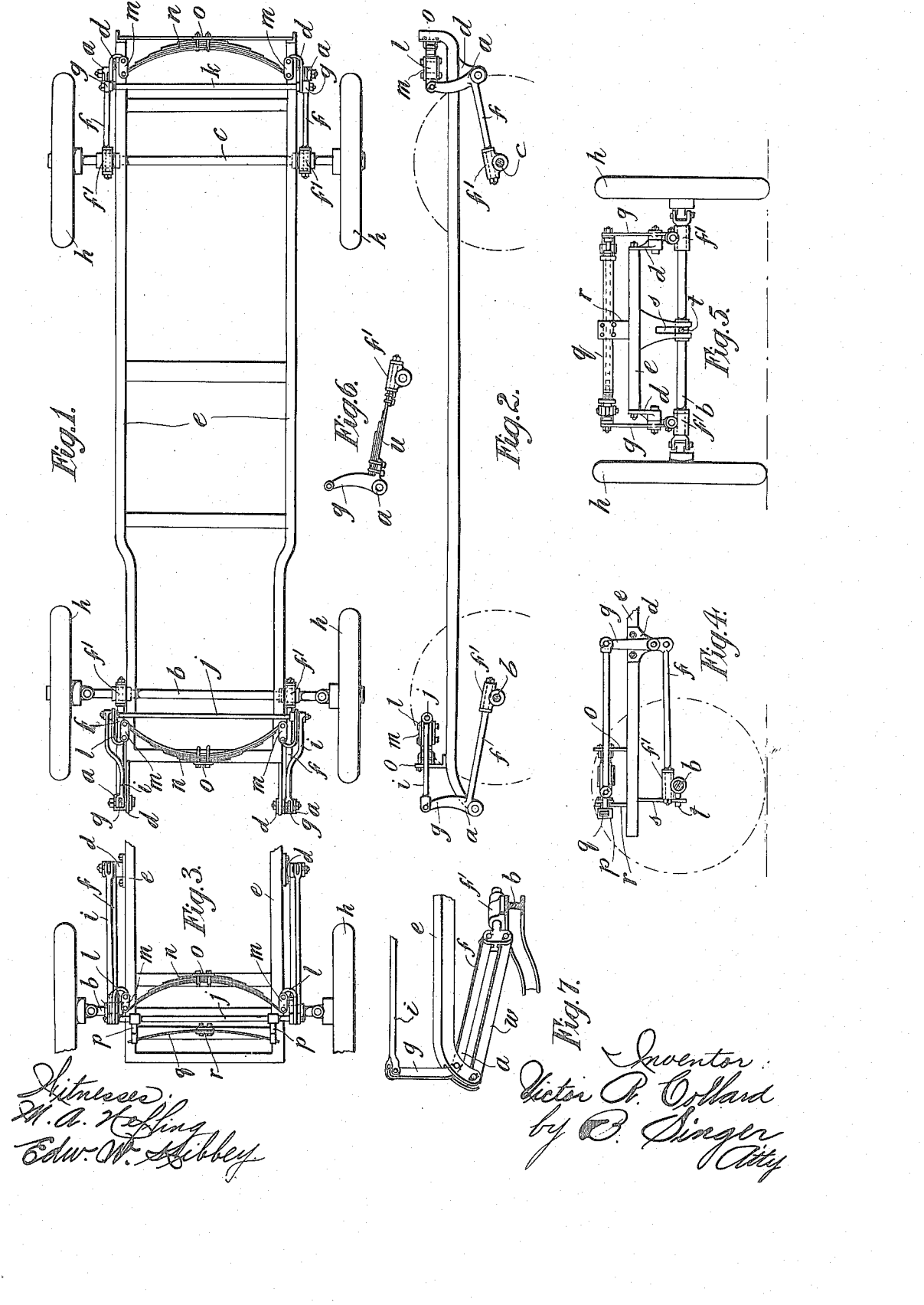

UNITED STATES PATENT OFFICE.

VICTOR RAOUL COLLARD, OF BALACLAVA, VICTORIA, AUSTRALIA.

RESILIENT SUSPENSION DEVICE FOR THE BODIES OF MOTOR-CARS AND SIMILAR ROAD-VEHICLES.

1,131,118.  Specification of Letters Patent.  Patented Mar. 9, 1915.

Application filed October 14, 1913. Serial No. 795,071.

*To all whom it may concern:*

Be it known that I, VICTOR RAOUL COLLARD, of "Graceville," 43ª Camden street, Balaclava, in the State of Victoria, Commonwealth of Australia, gentleman, have invented certain new and useful Improvements in Resilient Suspension Devices for the Bodies of Motor-Cars and Similar Road-Vehicles, of which the following is a specification.

This invention relates to an improved resilient suspension device for the bodies of motor cars and similar road vehicles which will be particularly useful in absorbing road shocks and jar consequent upon a vehicle passing over an uneven roadway.

Hitherto it has been the general custom to place flat or coiled springs of various types between the body and axles to obtain a desired amount of resiliency. The objection to this method of arrangement is that the springs, which must be of considerable strength, do not readily respond to the concussive force produced when the wheels strike an obstacle on the road.

Now the object of this invention is to obviate the above-mentioned disadvantage by the devisal and employment of means which will insure an added amount of resiliency being obtained from the springs employed and which will provide a greater degree of comfort to the occupants of the vehicle when the same is passing over very rough roads.

To these ends my invention broadly consists in the employment of suitable levers and pivotally mounted rods which are constructed and arranged in a novel manner to compress resilient members of approved form in a horizontal direction.

The invention will now be fully described aided by a reference to the accompanying sheets of drawings in which:—

Figure 1 is a view in plan and Fig. 2 is a view in side elevation of a motor body or chassis frame embodying the invention. Fig. 3 is a view in plan. Fig. 4 is a view in side elevation and Fig. 5 an end view showing a modification of the arrangement of levers and springs. Fig. 6 is a view in side elevation of a modification in a constructional part of the invention. Fig. 7 is a view in side elevation of a further modification in a constructional part of the invention.

According to this invention I provide two pairs of bell-crank levers $a$ one pair being connected to the front axle $b$ and the other pair connected to the rear axle $c$. These bell-crank levers $a$ are pivotally mounted at their angle portions on brackets $d$ secured to the chassis body $e$ and are constructed with long arms $f$ and short arms $g$. The ends of the long arms $f$ are swivelly connected to bearings $f^1$ fitted to the axles $b$ and $c$ of the traveling wheels $h$ while the shorter arms $g$ are adapted to project upwardly to or slightly above the chassis or body frame $e$.

The short arms $g$ of the bell-cranks $a$ over the front axle $b$ are connected by link rods $i$ to a transverse rod $j$ arranged approximately above the said axle while the short arms $g$ of the said bell-cranks over the rear axle $c$ are connected direct to a similar transverse rod $k$. These rods $j$ and $k$ are furnished with lugs or brackets $l$ which are connected by short links or shackles $m$ to the ends of semi-elliptic springs $n$ which are disposed on edge across the chassis or body frame $e$ and are rigidly clamped at their centers to brackets $o$ mounted on the said frame. These springs $n$ are located as shown at a position outside the transverse rods $j$ and $k$ and their ends are forced or drawn outwardly by the action of the bell-cranks and link connecting rods when the vehicle is depressed by passing over uneven ground or by the application of additional weight.

If desired the transverse rods $j$ and $k$ may be fitted with outwardly projecting arms $p$ of approved formation through or against which the ends of a straight or semi-elliptic spring $q$ may be passed or made to bear, see Fig. 3 of the drawings. The said arms $p$ normally bear against the said spring which is arranged transversely on the chassis body and supported by a central standard or bracket $r$ and its object is to serve the purpose of a buffer to absorb any shock caused by the rebound of the body when the vehicle passes over an obstruction or rut.

If preferred, the straight or semi-elliptic spring $q$ may be dispensed with and ordinary spiral compression springs mounted on thrust rods between the transverse rods $j$ and $k$ and buffer plates secured to the chassis body which construction can be effected easily by any person skilled in mechanics.

As shown in Figs. 3, 4 and 5 of the drawings the semi-elliptic spring n may be arranged inside the transverse rods j and k and the bell-crank levers a and link connecting rods i so arranged that during the depression of the body the ends of the said springs are drawn inwardly instead of outwardly as shown in Figs. 1 and 2 of the drawings. Further, if desired, a slotted guide s of approved form may be fitted to the chassis and arranged to engage a stud t attached to or formed on the axle in order to retain the chassis centrally during depression and in opposition to the centrifugal force caused by the vehicle moving rapidly around a curve.

The swivel connections between the long arms of the bell-cranks and the axles permit of any of the wheels rising independently of the others without causing any torsional strain to be applied to the said arms or straining any other part of the suspension device.

The long arms of the bell-cranks may, if preferred, be made of a plurality of spring bars u of unequal length and arranged similarly to those forming one half of a semi-elliptic spring, see Fig. 6 of the drawings. The said spring bars u are made of flat steel and are clamped to the bell-crank at one end and to a swivel bearing f¹ designed to fit on the axle at the other end. When the long arms are constructed in the manner immediately above described they will have more or less spring and so tend to increase the resiliency of the suspension contrivance.

In an alternate construction the inner end of the long arm f of the bell-crank a is pivotally mounted on an upwardly projecting lug of a bracket having a stem pivotally mounted in the bearing f¹ which in this instance can be rigidly secured to the axle. The said bracket has a depending lug to which is secured pivotally a link or rod w having its forward end mounted pivotally on a bracket d or in an extension of the chassis frame. This construction permits of a parallel movement of the long arm f of the bell-crank and link w and allows the axles to rise freely without rocking.

With the suspension device constructed and arranged as hereinbefore described a considerable space is available for the depression of the vehicle body thereby permitting of a great amount of resiliency and incidentally a greater degree of comfort to the occupants.

What I do claim is:—

1. A resilient suspension device for vehicles, comprising a pair of bell crank levers having long and short arms and pivoted to the chassis at their angle portion, means for swivelly connecting the long arms to the wheel axle, a semi-elliptic spring transversely disposed on the chassis, shackle links at each end of said semi-elliptic spring, a transverse rod connecting said shackle links, and means connecting said transverse rod with the short arms of said bell crank levers.

2. A resilient suspension device for the bodies of vehicles comprising a pair of bell-crank levers having long and short arms, the long arms of said bell-cranks being connected swivelly to the wheel axle and the angle portions pivotally mounted on the chassis, links connecting the short arms of said bell-cranks to a transverse rod adapted to bear against the ends of a semi-elliptic spring disposed transversely on the chassis, substantially as described.

3. A resilient suspension device for the bodies of vehicles, comprising a pair of bell crank levers having long and short arms, the long arms of said bell crank levers being connected swivelly to the wheel axle and the angle portion pivotally mounted on the chassis, links connecting the short arms of the said bell crank levers to a transverse rod adapted to bear against the ends of a semi-elliptic spring disposed transversely on the chassis, and one or more resilient springs bearing on said transverse rod in opposition to the said semi-elliptic spring, substantially as described and for the purpose set forth.

In testimony whereof I affix my signature in presence of two witnesses.

VICTOR RAOUL COLLARD.

Witnesses:
A. J. CALLINAN,
JAMES H. ANDERSON.